United States Patent [19]

Case

[11] Patent Number: 4,616,128
[45] Date of Patent: Oct. 7, 1986

[54] MECHANISM TO MAINTAIN CONTACT BETWEEN A MAGNETICALLY-ENCODED CARD AND A MAGNETIC TRANSDUCER SURFACE

[75] Inventor: Robert F. Case, San Diego, Calif.

[73] Assignee: Cubic Western Data, San Diego, Calif.

[21] Appl. No.: 575,036

[22] Filed: Jan. 30, 1984

[51] Int. Cl.⁴ ............................................. G06K 13/00
[52] U.S. Cl. .................................... 235/475; 235/483; 360/2
[58] Field of Search ...................... 360/2, 88; 235/449, 235/486, 485, 475, 483

[56] References Cited
U.S. PATENT DOCUMENTS 3,109,924 11/1963 Frederick .
3,217,996 11/1965 Bernier .
3,257,057 6/1966 Cederberg .
3,370,157 2/1968 Lockey .
3,641,283 2/1972 Brooke .
3,787,661 1/1974 Moorman et al. .................. 360/2 X
3,893,173 7/1975 Taggart et al. .
3,898,432 8/1975 Agnew et al. .......................... 360/2
3,984,049 10/1976 Shawen .
4,129,892 12/1978 Kasu et al. .
4,377,828 3/1983 Hayman et al. .

Primary Examiner—David L. Trafton
Attorney, Agent, or Firm—Brown, Martin, Haller & Meador

[57] ABSTRACT

A modularized roller assembly for holding a flexible, magnetically encoded card moving in a feeding direction through a channel against a curved transducer surface.

8 Claims, 4 Drawing Figures

MECHANISM TO MAINTAIN CONTACT BETWEEN A MAGNETICALLY-ENCODED CARD AND A MAGNETIC TRANSDUCER SURFACE

BACKGROUND OF THE INVENTION

The present invention generally pertains to apparatus which read magnetically-encoded data from or write such data onto a moving magnetic medium, and more particularly it pertains to a device for maintaining contact between magnetic medium on a moving card and a magnetic transducer surface.

As in known in the art, transport systems are available for processing flexible magnetically-encoded tickets for purposes such as transit fare transactions. Such an apparatus is taught, for example, in U.S. Pat. No. 4,377,828 to Hayman et al. The ticket transport of the Hayman patent includes a channel which is adapted to have a ticket propelled through it. A transducer is positioned adjacent the channel for reading data from or writing data onto a magnetic strip on the ticket. A roller is provided in the ticket channel opposite the transducer, which operates to press the ticket against the transducer as it moves through the channel. The pressure is for the purpose of bringing the magnetic strip and the transducer into a close and precise contacting relationship. Such a relationship is characterized by an unvarying spatial orientation of the magnetic strip on a card and the magnetic transducer, which must be maintained while the card is propelled through the channel.

Prior art mechanisms for positioning an encoded recording medium, such as magnetic tape or punched cards against a read or write head are well-known. Such mechanisms include one which moves from a rest position into an operating position for either tensioning the medium against or pressing it into contact with a transducer. Similar tensioning mechanisms are disclosed in U.S. Pat. Nos.: 3,217,996; 3,257,057; 3,370,157; 3,641,283; 3,984,049; and 4,129,892. However, the use of such positionable tensioning or contacting mechanisms in a high-speed ticket transport mechanism such as is described above is impractical. A positionable tensioning device in such an application would have to be provided with an asynchronously operating, high-speed position actuater which could respond to the sporadic introduction of tickets into the transport and the high speed with which they are propelled therethrough. As is known, a positionable tensioning device and its associated actuating circuitry can increase the cost and reduce the reliability of a transport apparatus in which they are employed.

In U.S. Pat. No. 3,109,924, an apparatus is described for maintaining a moving, information-bearing card in close relationship with a card reader by providing a rotating drum having a high-friction surface which engages an endless belt. The card is nipped between the belt and the rotating high friction surface, and moved thereby past the transducer. This card reader is also unsuitable for use in a high-speed ticket transport for the reason that the high-friction portion of the drum can wear and slough material onto the processed card, thereby obscuring information on the card. Furthermore, the endless belt will stretch and require periodic replacement.

Another mechanism for maintaining a magnetic card in close relationship with an associated read/record head is disclosed in U.S. Pat. No. 3,893,173 to Taggart et al. In the Taggart apparatus, the magnetic card is conformed to the contour of the magnetic head through the action of a plurality of spring-loaded balls which press the card against the magnetic head. The engagement balls are displaced against the spring and the card is slid between them and the surface of a card guide. Thus, the balls are deflected upward by the edge of the card and require a minimum displacement force which is related to the physical characteristics of the card. Manifestly, the physical requirements will limit the composition and the thickness of the card and bar the use of certain materials and dimensions.

Therefore, it is the principal object of the present invention to provide a mechanism for maintaining physical contact between the magnetic medium of a moving farecard and a magnetic transducer, which eliminates the need for a positionable engagement mechanism, reduces the requirement for periodic maintenance, and which will not obscure the magnetic information on the card or limit the card's composition or dimension.

This and other objects of the invention will become readily apparent in the ensuing specification when taken together with the drawings.

SUMMARY OF THE INVENTION

The present invention provides an apparatus for, while a flexible magnetically-encoded card is moving in a feeding direction through a channel formed between a pair of opposing channel surfaces, positioning the card against a curved transducer surface which extends through one of the channel faces into the channel. The positioning apparatus includes a pair of rollers which rotate about parallel stationary axes and which are disposed in the channel on either side of and adjacent to the cylindrical transducer surface for conforming the moving card to a curved contacting path around the transducer surface.

The parallel rollers overcome the limitations of prior engagement mechanisms by forcing the moving card into and retaining it on its curved contacting path around the transducer surface without the requirement for displacement of either of the rollers toward or away from the surface. Moreover, formation of the rollers from a high lubricity plastic material prevents the sloughing of material onto the card and reduces the wear, and thus the maintenance, of the mechanism. Finally, the only limitation imposed on the composition of the card by the mechanism of the invention is the requirement that the card be sufficiently flexible to follow the curved path around the transducer surface.

DETAILED DESCRIPTION OF THE INVENTION

Transport apparatuses which rapidly reciprocate magnetically high-encoded tickets or cards to permit transducers to read, write and/or verify information on the ticket normally include a channel for guiding the ticket through the transport past one or more transducers which perform an information transfer operation with a strip of magnetic information on the ticket. Typical of such transports is that disclosed in U.S. Pat. No. 4,377,828, which is assigned to the assignee of the present invention and which is incorporated herein by reference.

Figure 1:
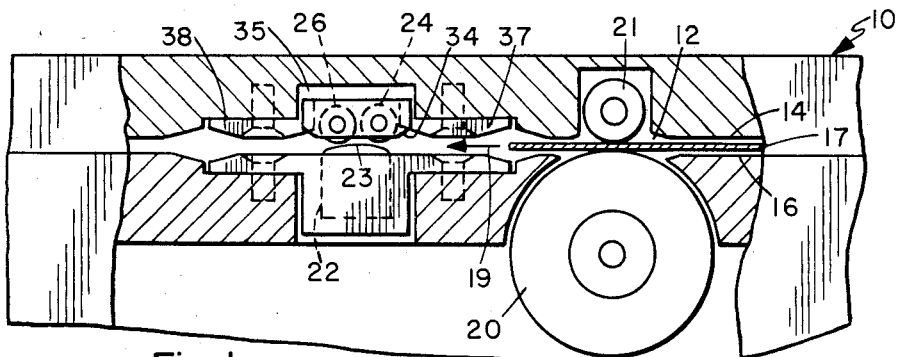
FIG. 1 is a partial side cutaway view of a ticket transport illustrating the location of the mechanism of the invention relative to a curved transducer surface in the transport channel.

Reference to FIG. 1 will illustrate how a mechanism according to the present invention may be utilized in, for example, a ticket transport such as that taught in the incorporated patent to force a ticket into a close engagement with a transducer. As illustrated, the ticket transport includes a housing, a portion of which is indicated generally by 10, which has a ticket channel 12 formed between an upper channel surface 14 and a lower channel surface 16. The channel 12 defines a generally linear path of travel for a ticket 17. The ticket is propelled through the channel 12 by one or more drive rollers, one of which is indicated by 20. Drive rollers such as that indicated by 20 are known in the art and can be provided with rotary velocity for propelling a ticket by any number of well-known means. The ticket 17 is nipped between the drive roller 20 and an associated engagement roller 21. The drive roller 20 rotates in a direction which will cause the ticket 17 to be propelled in a feeding direction indicated by the arrow 19 toward, over, and past a magnetic transducer 22.

The magnetic transducer 22 can comprise any one of a broad range of known devices which are capable of conducting an information transfer operation with a strip of magnetic material, not shown, which is placed on a surface of the ticket 17. For example, the transducer 22 can be a readhead which is operated to sense magnetically-encoded information which has been previously entered onto the magnetic strip of the ticket 17. As is known, a transducer such as 22 normally has an elongated curved surface which may have a cylindrical or elliptical cross-sectional shape. In order for a reliable information transfer operation to take place between the transducer 22 and the magnetic strip on the ticket 17, the strip must be maintained in close proximity to the surface 23 of the transducer.

Figure 2:
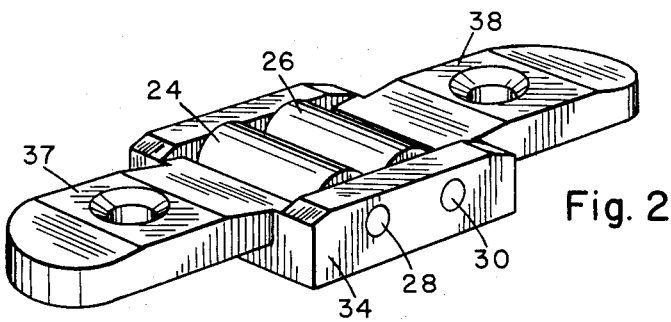
FIG. 2 is a perspective view of the mechanism of the invention in a modularized form which includes a frame holding a pair of engagement rollers.

As is known, a transducer such as 22 is typically held in the transport housing 10 so that the transducer surface 23 protrudes through the lower channel 16 into the channel 12. In order to conduct a reliable transfer of information between the transducer 22 and the magnetic strip on the ticket 17, the surface of the ticket on which the magnetic strip is located must be conformed to and brought into contact with the protruding surface 23 while the ticket is moving. This is accomplished by the mechanism of the invention, whose operation can be appreciated with reference to FIGS. 1, 2 and 3.

The moving ticket 17 which is propelled through the channel 12 in the feeding direction indicated by the arrow 19 is brought into contact with and conformed to the protruding transducer surface 23 by means of a pair of rollers 24 and 26 which are mounted in the housing 10 so that they protrude into the channel 12 through the upper channel surface 14. The rollers 24 and 26 rotate about a pair of fixed, substantially parallel axes 28 and 30, respectively. Roller 24 is positioned adjacent one side 28 of the active transducer surface while the roller 26 is similarly positioned adjacent the other side 29 of the transducer surface. The axes 28 and 30 are defined by a pair of fixed shafts, not shown, which are journaled between the sides of an assembly frame 34. The assembly frame 34 is useful for mounting the rollers in a recess 35 which is formed in the upper channel surface 14 opposite the protruding transducer surface 23. A pair of flanges 37 and 38, which extend outwardly from the assembly frame 34, provide mounting surfaces, each of which can receive a screw for mounting the assembly frame 35 in the recess of the upper channel surface 14.

Both of the rollers 24 and 26 are elongated cylinders, are oriented transversely to the channel 12 and are generally perpendicularly to the feed direction of the ticket 17. In addition, the axes 28 and 30 are substantially parallel to the major axis of the elongated transducer surface 23. Preferably, the rollers 24 and 26 are formed from a durable (high PV) high-lubricity material, which can comprise a commercially available, moldable composite plastic such as nylon.

In operation, the ticket 17 moves in the feeding direction 19 when it is nipped between the drive roller 20 and the engagement roller 26. While moving in this direction, the edge 40 of the ticket will be driven into contact with the side 29 of the transducer surface 23 and then will be deflected upwardly by the side 29 toward the upper channel surface 14. As the card is driven further in the feeding direction, the edge 40, and after it the upper surface of the card 17, will contact first the roller 26 and then the upper channel surface 14, which will cause the ticket to be moved in a direction tangential to the top of the surface 23. Finally, the ticket will be deflected back down toward the lower channel surface 16 by the engagement roller 24. Then the upper and lower channel surfaces will cooperate to guide the ticket further in the forward direction.

Figure 3:
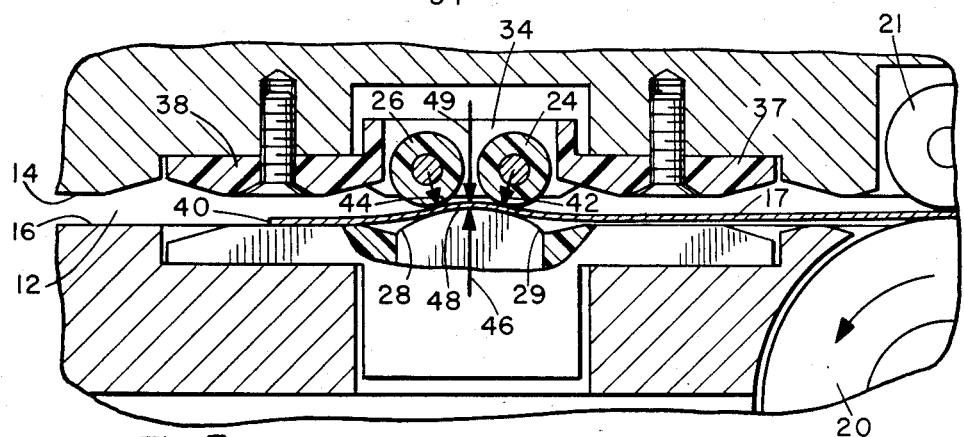
FIG. 3 is an enlarged side view of a ticket engaged between the mechanism of the invention and a curved transducer surface.

At the point where the leading edge 40 of the ticket 17 has passed both of the rollers 24 and 26 and contacts the lower channel surface 16, the ticket will be maintained in a flexed position by the cooperation of the rollers 24 and 26 with the protruding transducer surface 23. Preferably, the ticket is formed from any available high-strength, flexible material which can include plastic, cardboard, or the like. As illustrated in FIG. 3, the innate flexure of the material cooperates with the spaced retaining forces of the rollers (indicated by the arrows 42 and 44) and the transducer (arrow 46) to act as a spring to urge the flexed portion 48 of ticket 17 against the transducer surface 23 in the direction indicated by arrow 49.

Figure 4:
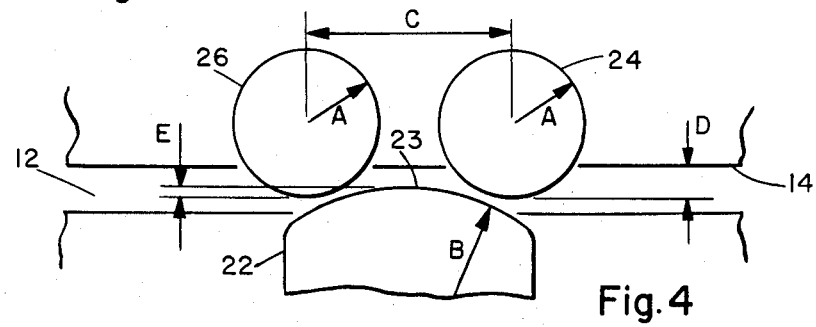
FIG. 4 is illustrative of certain dimensional characteristics of the mechanism of the invention.

In the inventor's experience, plastic fare cards which are used in a representative ticket transport, can vary in width from 0.007 inches to 0.011 inches, which variation must be provided for in positioning the rollers 24 and 26 with respect to the sides 28 and 29 of the transducer surface. In practice, the inventor has found that the mechanism of the invention operates suitably with such tickets when the dimensions illustrated in FIG. 4 have the approximate magnitudes listed in Table I.

TABLE I

| Dimension | Approximate Magnitude |
|---|---|
| A, Roller Diameter | 0.25 inches |
| B, Effective radius of cylindrical portion of transducer surface | 0.75 inches |

TABLE I-continued

| Dimension | Approximate Magnitude |
| --- | --- |
| C, Spacing between roller axes | >2A |
| D, Spacing from upper channel surface to roller outer diameter | 0.100 inches |
| E, Spacing from roller outer diameter to highest point of the cylindrical portion of transducer surface | 0.010–0.016 inches |

Having described a preferred embodiment of the engagement mechanism of the invention, it will be apparent to those skilled in the art that the mechanism may be modified in arrangement and detail. Therefore, the protection afforded my invention should be limited only in accordance with the scope of the following claims.

I claim:

1. In an apparatus for transporting and reading magnetically-encoded cards in which a pair of opposing channel surfaces form a card transport channel and which includes a cylindrical transducer surface that protrudes through a first one of said channel surfaces into said channel and a mechanism for holding a magnetically-encoded card against said transducer surface while the card is moving in a feeding direction through said channel, the improvement to said mechanism comprising:

a pair of substantially parallel rollers, each of which protrudes through the second one of said channel surfaces to be disposed on a respective side of and adjacent to said transducer surface so as to confine a magnetically-encoded card moving in said channel in said feeding direction to follow a curved contacting path around said transducer surface, and each of which is disposed to rotate around a respective axis having a predetermined fixed relationship with respect to said channel; and a frame module for rotatably holding said rollers in a spaced relationship and a recess means in said second channel surface opposite said transducer surface for holding said frame module.

2. The improved mechanism of claim 1 wherein said frame module comprises flange means for securing said frame module in said recess means.

3. The improved mechanism of claim 1 wherein each said roller is formed from a durable, high lubricity plastic material.

4. The improved mechanism of claim 1 wherein said rollers have substantially equal diameters, A, and their axes are separated by substantially 2A.

5. The improved mechanism of claim 4 wherein each said roller protrudes into said channel at a distance of substantially 0.5A, measured from said opposing channel surface to the outer diameter of said roller.

6. The improved mechanism of claim 5 wherein the distance between said outer diameter of each said roller and the furthest protrusion of said curved transducer surface away from the second of said channel surfaces is in the range, R, of $0.05A < R < 0.06A$.

7. A mechanism for enhancing data transfer between a magnetically-encoded card moving in a feeding direction through a channel formed between two opposing channel surfaces and a cylindrical magnetic transducer surface which protrudes through a first one of said channel surfaces into said channel by establishing close contact between said moving card and said transducer surface, said mechanism comprising:

a pair of substantially parallel rollers disposed in fixed rotating positions in said channel on either side of and adjacent to said transducer surface so that said transducer surface protrudes between said parallel rollers and said parallel rollers define a curved contacting path around said transducer surface;

recess means in said second channel surface substantially opposite said transducer surface for locating said rollers in said channel; and a frame module in said recess means for rotatably holding said rollers in a predetermined spaced relationship.

8. The mechanism of claim 7 wherein said frame module includes flange means for securing said frame module in said recess means.

* * * * *